(12) United States Patent
Guzman Lucero et al.

(10) Patent No.: US 9,675,941 B2
(45) Date of Patent: Jun. 13, 2017

(54) MEMBRANES FOR GAS SEPARATION SYNTHESIZED FROM POLYIMIDES CONTAINING 4-FLUORO-4',4"-DIAMINOTRIPHENYL-METHANE

(71) Applicant: INSTITUTO MEXICANO DEL PETROLEO, Mexico City (MX)

(72) Inventors: Diego Javier Guzman Lucero, Mexico City (MX); Javier Guzman Pantoja, Mexico City (MX); Jorge Froylan Palomeque Santiago, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 19 days.

(21) Appl. No.: 14/699,462

(22) Filed: Apr. 29, 2015

(65) Prior Publication Data

US 2015/0314244 A1 Nov. 5, 2015

(30) Foreign Application Priority Data

Apr. 30, 2014 (MX) .................... MX/a/2014/005222

(51) Int. Cl.
*B01D 71/64* (2006.01)
*B01D 53/22* (2006.01)
*B01D 69/06* (2006.01)
*B01D 67/00* (2006.01)
*C08J 5/18* (2006.01)
*C08G 73/10* (2006.01)

(52) U.S. Cl.
CPC .......... *B01D 71/64* (2013.01); *B01D 53/228* (2013.01); *B01D 67/0009* (2013.01); *B01D 69/06* (2013.01); *C08G 73/1039* (2013.01); *C08G 73/1053* (2013.01); *C08G 73/1064* (2013.01); *C08G 73/1067* (2013.01); *C08G 73/1071* (2013.01); *C08J 5/18* (2013.01); *B01D 2256/10* (2013.01); *B01D 2256/12* (2013.01); *B01D 2256/16* (2013.01); *B01D 2256/18* (2013.01); *B01D 2256/24* (2013.01); *B01D 2256/245* (2013.01); *B01D 2257/102* (2013.01); *B01D 2257/502* (2013.01); *B01D 2257/504* (2013.01); *B01D 2325/20* (2013.01); *B01D 2325/34* (2013.01); *C08J 2379/08* (2013.01); *Y02C 10/10* (2013.01); *Y02P 20/152* (2015.11)

(58) Field of Classification Search
CPC .. B01D 53/22; B01D 53/228; B01D 67/0009; B01D 69/06; B01D 71/64; C08G 73/1039; C08G 73/1053; C08G 73/1064; C08G 73/1067; C08G 73/1071; C08J 5/18

See application file for complete search history.

(56) References Cited

U.S. PATENT DOCUMENTS

| | | | | |
|---|---|---|---|---|
| 3,899,309 A | * | 8/1975 | Hoehn | B01D 71/64 210/500.28 |
| 4,230,463 A | | 10/1980 | Henis et al. | |
| 4,474,858 A | | 10/1984 | Makino et al. | |
| 4,657,564 A | | 4/1987 | Langsam | |
| 4,717,394 A | | 1/1988 | Hayes | |
| 4,964,887 A | | 10/1990 | Shimatani et al. | |
| 4,983,191 A | * | 1/1991 | Ekiner | B01D 71/64 210/500.39 |
| 5,074,891 A | | 12/1991 | Kohn et al. | |
| 5,085,676 A | * | 2/1992 | Ekiner | B01D 71/64 210/500.23 |
| 5,112,941 A | * | 5/1992 | Kasai | B01D 71/64 528/128 |
| 5,178,940 A | * | 1/1993 | Matsumoto | B01D 71/64 427/245 |
| 5,334,697 A | | 8/1994 | Simmons | |
| 5,964,925 A | | 10/1999 | Ozcayir et al. | |
| 6,096,850 A | * | 8/2000 | Chiang | C08G 73/1039 430/170 |
| 6,166,013 A | * | 12/2000 | Coghlan | C07C 211/52 514/239.5 |
| 6,896,717 B2 | | 5/2005 | Pinnau et al. | |
| 2004/0177753 A1 | * | 9/2004 | Chung | B01D 53/228 95/43 |
| 2011/0290112 A1 | | 12/2011 | Liu et al. | |
| 2012/0323059 A1 | * | 12/2012 | Liu | B01D 71/64 585/818 |
| 2013/0014643 A1 | | 1/2013 | Lokhandwala et al. | |

* cited by examiner

*Primary Examiner* — Jason M Greene
(74) *Attorney, Agent, or Firm* — Dickinson Wright PLLC

(57) ABSTRACT

The present invention relates to the synthesis of linear aromatic polyimides and the production of membranes for the separation of gases. Specifically, polyimides featuring in their chemical structure, in the part derived from a diamine, 4-fluoro-4',4"-diaminotriphenylmethane, and an aromatic dianhydride derived from tetracarboxylic acid. Polyimides are soluble in amidic solvents such as N,N'-dimethylformamide, N,N'-dimethylacetamide, N-methyl-2-pyrrolidone, etc., which are processed as dense membranes by controlled evaporation of the solvent. The resulting membranes are capable of separating at least a gaseous mixture constituted by two components such as $H_2/CH_4$, $He/N_2$, $H_2/CO_2$, $O_2/N_2$, $CO_2/CH_4$ and $CO_2/N_2$.

18 Claims, No Drawings

MEMBRANES FOR GAS SEPARATION SYNTHESIZED FROM POLYIMIDES CONTAINING 4-FLUORO-4',4''-DIAMINOTRIPHENYL-METHANE

CROSS-REFERENCE TO RELATED APPLICATION

This application claims the benefit and priority under 35 U.S.C. §119 to Mexican Patent Application No. MX/a/2014/005222 with a filing date of Apr. 30, 2014, the disclosure of which is incorporated herein by reference in its entirety.

FIELD OF THE INVENTION

The present invention is related to the synthesis of a new class of chemical structures from the family of linear aromatic polyimides with high molecular weight for its application as selective membranes for gas separation, particularly for the separation of $H_2/CH_4$, $He/N_2$, $H_2/CO_2$, $O_2/N_2$, $CO_2/CH_4$ and $CO_2/N_2$.

Specifically, the invention relates to the development of dense membranes whose polymeric chemical structures feature the combination of: 1) in the part coming from diamine, the structure of the diamine 4-fluoro-4',4''-diaminotriphenyl-methane, and 2) in the part coming from the dianhydride compound, an aromatic dianhydride derived from tetracarboxylic acid, which can be commercially available or any other aromatic dianhydride derived from tetracarboxylic acid.

BACKGROUND OF THE INVENTION

The separation processes by means of membranes display remarkable advantages with respect to the energy expenses generated by the purification of mixtures either liquid or gaseous and conventional separation processes such as distillation, cryogenic separation, absorption, etc. The separation technologies based on membranes demand low operation costs and the different obtained products can be commercialized or reused due to their high degree of purity. The separation of gaseous mixtures by membranes is of great interest in many oil industry operations such as sweetening of natural gas, hydrogen separation in the ammonia purge currents, ethane separation plants, etc.

In the last two decades, the separation of gases by means of polymeric membranes has been focused on the use of vitreous polymers with aromatic structure and high vitreous transition temperature. In this type of structure, molecules with small kinetic diameters such as hydrogen and helium pass through faster, whereas voluminous molecules such as methane, nitrogen, ethane or propane pass through more slowly. The first industrial membranes used for the separation of gases were made of cellulose acetate. The main disadvantages featured by the membranes derived from cellulose are related to the limited selectivity/permeability ratio and the low thermal, mechanical and chemical stabilities. The global trend regarding the use of polymeric membranes is aiming at the application of high performance polymers such as polyimides, polyetherimides, polyamides, polybenzimidazoles, polytrimethylsilylpropine, polytriazole, among others.

Most patents dealing with the design of vitreous polymer membranes for the separation of gases date back from the 1980's-1990's as can be shown by the following information:

U.S. Pat. No. 4,230,463 issued in 1980 to Monsanto relates to the separation of a multicomponent mixture of gases using an asymmetric membrane (also known as anisotropic) made of commercial polysulfone, which included some chemical modifications such as the phosphonization, phosphorylation, sulphonation and inclusion of primary, secondary, tertiary and quaternary amines. The chemical structure of the commercial polysulfones are provided by Union Carbide (P-1700 and P-3500), 3M (Astrel 360 plastic), and ICI (polyether sulfone, polyarylene ether sulfone). Hollow fibers were fabricated by the Phase Inversion Method and later were covered with polymers that present a higher impairment to the flow of gases; among these coatings are found: polysiloxanes, polyurethanes, polyimines, polyamides, polyesters, cellulosic polymers, polypropylene glycol, polyethylene, polypropylene, polybutadiene, etc.

U.S. Pat. No. 4,474,858 issued in 1984 to UBE relates to the fabrication of porous aromatic polyimide membranes featuring the interstitial inclusion of a liquid for the separation of gases, specifically for the separation of hydrogen/carbon monoxide and nitrogen/oxygen. The chemical structure of the porous support is

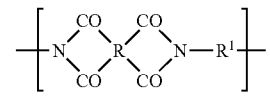

where R represents a tetravalent aromatic radical and $R^1$ represents a divalent aromatic radical. The radical R can have the formula:

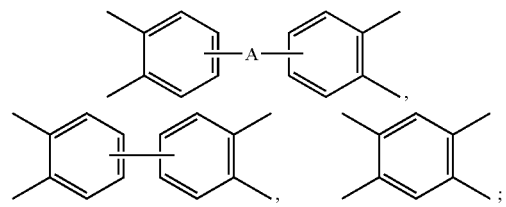

$R^1$ can have the formula:

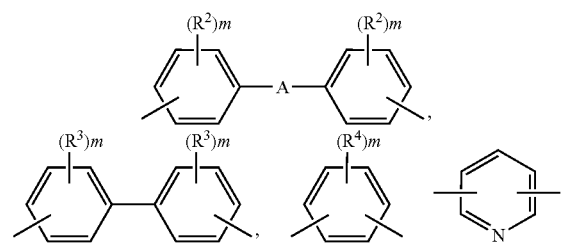

where A represents a group among —O—, —S—, —CO—, —$SO_2$—, —SO—, —$CH_2$—, —$C(CH_3)_2$—; and where $R^2$, $R^3$ and $R^4$ represent an atom of hydrogen, alkyl radicals of 1-3 carbon atoms or alkoxy radical with 1-3 carbon atoms and m is an interger between 1 and 4.

The main characteristics of the impregnating liquid are a boiling point of at least 180° C., and be incapable of dissolving the support, but capable of separating a gaseous mixture. In this case, naphthalenes either halogenated or alkylated can be used, in general, derived from naphthalene, aliphatic alcohols between 9 and 17 carbon atoms, aliphatic monocarboxylic acids between 9 and 17 carbon atoms and silicon liquid compounds, for example, polydimethylsiloxane, polymethyl phenyl siloxane and polytrifluoropropylmethyl siloxane.

U.S. Pat. No. 4,657,564 to Air Products and Chemicals, Inc. discloses fluorinated polymeric membranes for the gas separation process. The membrane prototypes were made of a polymer known as poly(trimethyl silyl propyne) with general formula:

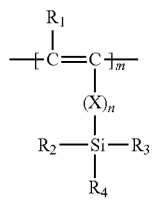

where $R_1$ is a linear or branched alkyl group $C_1$-$C_4$; $R_2$ and $R_3$ can be linear or branched alkyl groups $C_1$-$C_6$; $R_4$ is an alkyl group, a linear aryl or branched alkyl group $C_1$-$C_{12}$; X is an alkyl group $C_1$-$C_3$ or

m≥100 y n=0 or 1. Such a membrane can be used efficiently in the separation of the following gas pairs: He/$CH_4$, $H_2$/CO, $CO_2$/$CH_4$, $CO_2$/$N_2$, and $H_2$/$N_2$.

U.S. Pat. No. 4,717,394 issued in 1988 to E.I. Du Pont de Nemours and Company relates to polyimide membranes with semiflexible chemical structures for the separation of gases. By controlling the rigidity of the polyimide molecule, the membranes can feature high permeation of gases and keep a suitable separation level of the gaseous mixture.

The family of polyimides have the general formula:

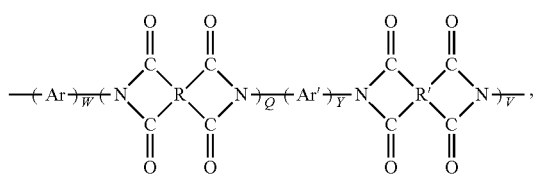

where: Ar is:

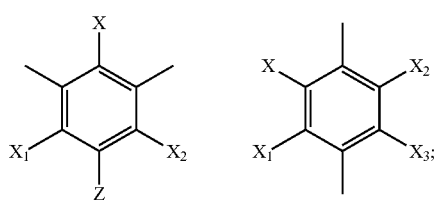

R can be:

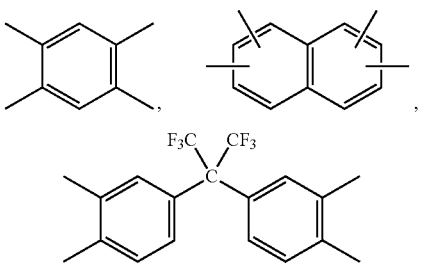

or mixtures; Ar' can be:

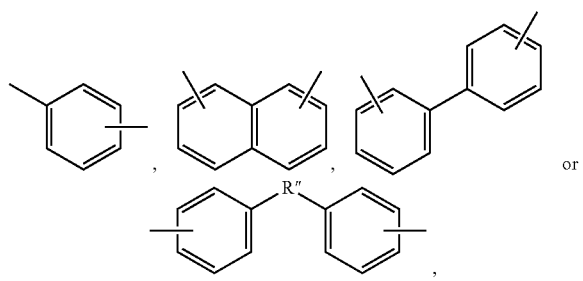

or mixtures; R' can be:

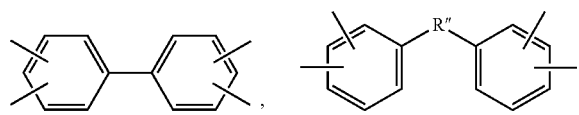

or mixtures and R" can be:

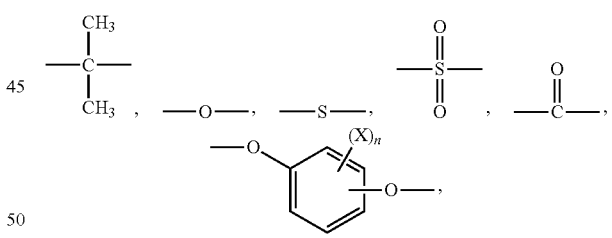

where n=1-4, X—$X_4$ are alkyl groups $C_1$-$C_6$ or aromatics groups $C_6$-$C_{13}$; Z can be H or X—$X_4$. The combination of the structures of the flexible amines with the rigid dianhydrides gives as a result chemical structures of semiflexible polymers, which promote the permeation of certain gases throughout the polymeric membrane. The membranes featured in this invention can be useful for the recovery of hydrocarbons in ammonia plants, the separation of CO/$H_2$ in synthesis gas systems, the separation of either CO or $CO_2$ from hydrocarbons and in the enrichment of either oxygen or nitrogen from air.

U.S. Pat. No. 4,964,887 to Nitto Denko Corporation relates to permeable membranes for the separation process of methane. The polyimide membrane has the formula:

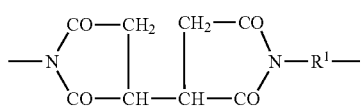

where $R^1$ can be a group of aliphatic, alicyclic and aromatic hydrocarbon or a divalent organic group. The membrane exhibits high selectivity and permeability to $CO_2$ in the $CO_2/CH_4$ separation. In this multilayer membrane, both the polyimide support and elastomer film layer work as $CO_2$ permeable materials. Typical examples feature either homo or copolymers of polypropylene, polyvinyl chloride, polybutadiene, polyisoprene, and polyisobutylene. The copolymers can contain functional groups such as acrylonitrile, (metha) acrylic esters, and (metha) acrylic acid. Intercrosslinked silicon resins can also be used.

U.S. Pat. No. 5,074,891 issued in 1991 to Hoechst Celanese Corp. relates to the synthesis of membranes for the separation of gases. In this invention, polyimidic membranes are obtained by the Condensation Method by reacting fluorinated diamines such as 2,2'-bis(3-aminophenyl) hexafluoropropane, 2,2'-bis(4-aminophenyl) hexafluoropropane and 2-(3-aminophenyl)-2'-(4-aminophenyl) hexafluoropropane with aromatic dianhydrides such as the dianhydride of the 3,3',4,4' benzophenone tetracarboxylic acid. Membranes with high permeability and good separation factors are obtained.

U.S. Pat. No. 5,178,940 issued in 1993 to Nitto Denko K.K. relates to the formation of a composite membrane made of fluorinated polyimide type 6FDA with a film layer, and also of an asymmetric-no-composite membrane. The fluorinated polyimide structure is:

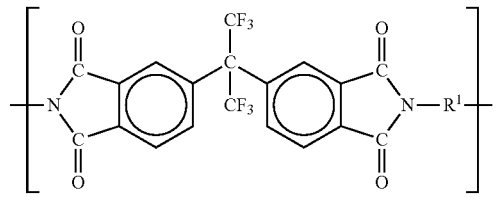

where $R^1$ is a divalent aromatic, aliphatic or alicyclic hydrocarbon or a divalent organic group consisting of aromatic, aliphatic or alicyclic hydrocarbons linked to the other part of the divalent group. The thin film can be made of polyester, polyol, polyurethane, polyamide, epoxy resin, cellulose, etc. The permeation values and the separation factors are higher when a composite membrane is used instead of an asymmetric-no-composite membrane.

U.S. Pat. No. 5,334,697 to L'Air Liquide S.A. relates to a polyimide membrane for the separation of gases. In this invention, a separation membrane for at least one component of a gaseous mixture was obtained. The polyimide is obtained from xanthan dianhydrides 9,9-disubstituted and aromatic diamines. The dianhydride has the following structure:

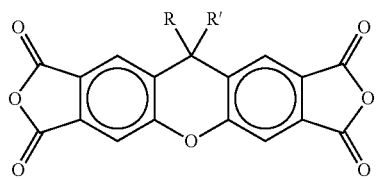

where R and R' can be —H, —$CH_3$, —$CF_3$, -phenyl, -substituted phenyl groups, alkyl groups or perfluoroalkyl $C_1$-$C_{16}$, preferably $C_1$-$C_8$. R and R' can be similar or different. These polyimides present a suitable behavior for the separation of nitrogen and oxygen from air. This polyimide has the general formula:

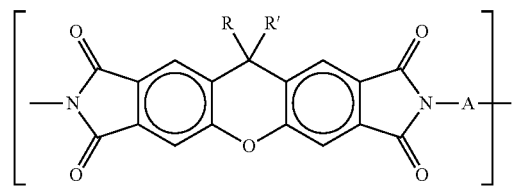

where R and R' are defined above; A is a diamine of the type:

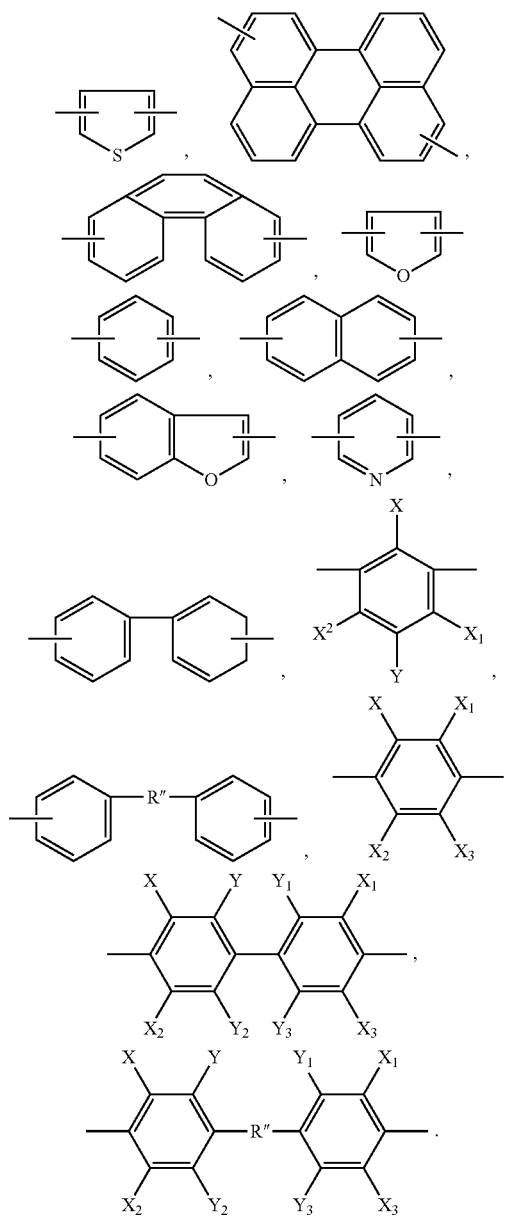

-continued

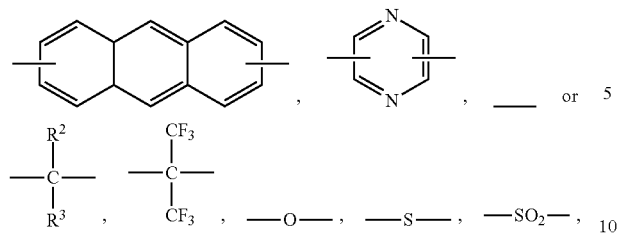 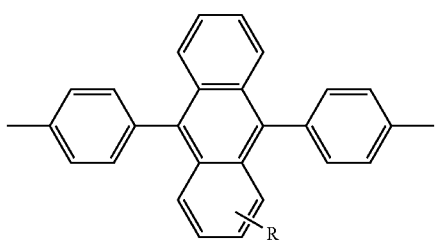

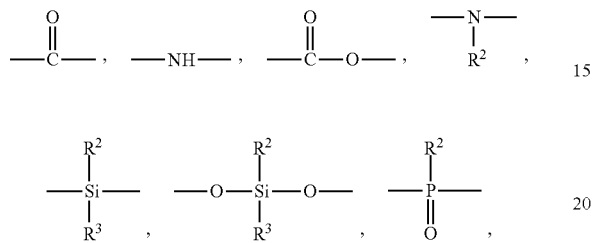

mixtures; R" can be:

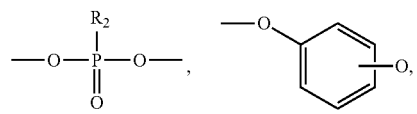

or mixtures thereof; where $R^2$ and $R^3$ are alkyl or aryl groups; —X, —$X_1$, —$X_2$ and —$X_3$ are alkyl groups; $C_1$-$C_6$ and the groups —Y, —$Y_1$, —$Y_2$ and —$Y_3$ can be —X or —H.

U.S. Pat. No. 5,964,925 to Praxair Technologies, Inc. relates to gas separation membranes with sulfonated polyimides. The general formula of these compounds are:

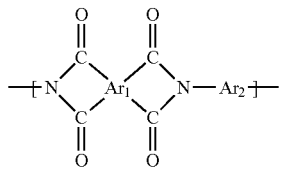

where $Ar_1$ and $Ar_2$ are aromatic radicals. The aromatic rings contain radical groups of sulfonic acid (—$SO_3H$, —$SO_3M$ or —$SO_2OR^1$), where M is an organic base, ammonium ion or alkali of the type $K^+$, $Na^+$, $Li^+$, or a transition metal ion. $R^1$ is an alkyl radical with less than $C_6$ or an aryl radical, preferably methyl or ethyl. $Ar_e$ is an aromatic diamine represented by:

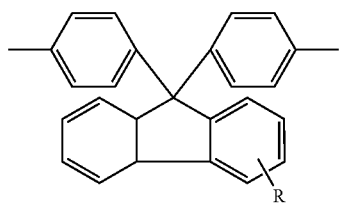

-continued

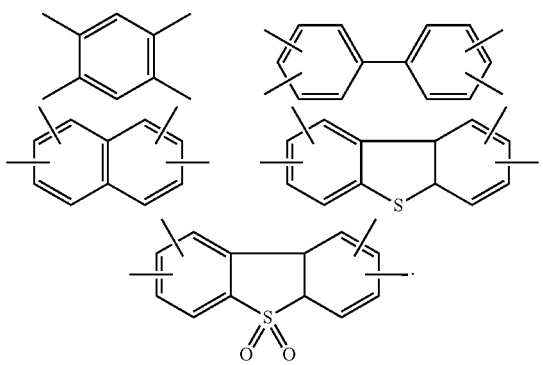

where R is a sulfonic group, $Ar_1$ is represented among others by:

U.S. Pat. No. 6,896,717 issued in 2005 to Membrane Technology and Research, Inc. relates to a membrane that can be used for the separation of gases also containing hydrocarbon vapors ($C_{3+}$). The base membrane incorporates a thin selective layer of a fluorinated polymer capable of protecting the membrane support from vapors and liquids of $C_{3+}$ hydrocarbons. More specifically, it is used for the separation of hydrogen/methane, ethane or ethylene and carbon dioxide or hydrogen sulfide/methane, ethane or ethylene. The selective layer can be made of plyimide, polysulfone, cellulose acetate, among others. The membrane microporous support should present a low flow resistance and be preferably asymmetric. The dense layer free of defects is the one that carries out the separation and should be made of the same type of vitreous polymer as that of the support, for example, polysulfone, polyamide, polyimide, polyetherimide, polyvinylidene fluoride, etc. Such compounds should be preferably perfluorinated with a carbon:fluorine ratio of 1:1. The structure of the commercial polymer of Solvay Solexis, known commercially as Hyflon® is:

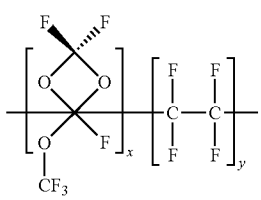

where x and y represent dioxol and tetrafluoroethylene, x+y=1. In some cases, the membranes can include agglutinant layers between the different constituents in order to coat the small defects on the support surface and avoid dragging the imperfections to the selective layer, or it also provides a layer of a highly permeable material that allows the connection of the pores in the support section. The sealing layer protects the thin permselective layer.

U.S. Patent Publication No. 2011/0290112 to UOP LLC relates to air separation using polyimide membranes. Such membranes can be fabricated as flat sheets or hollow fibres. These present an $O_2/N_2$ selectivity higher than 3 at 60° C. and a $CO_2/CH_4$ selectivity higher than 20 at 50° C. The general formula of these polyimides are:

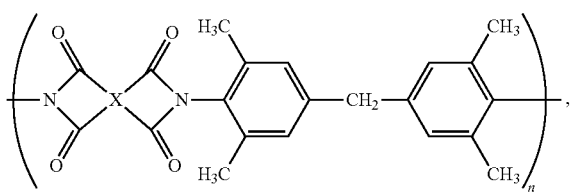

where X can be:

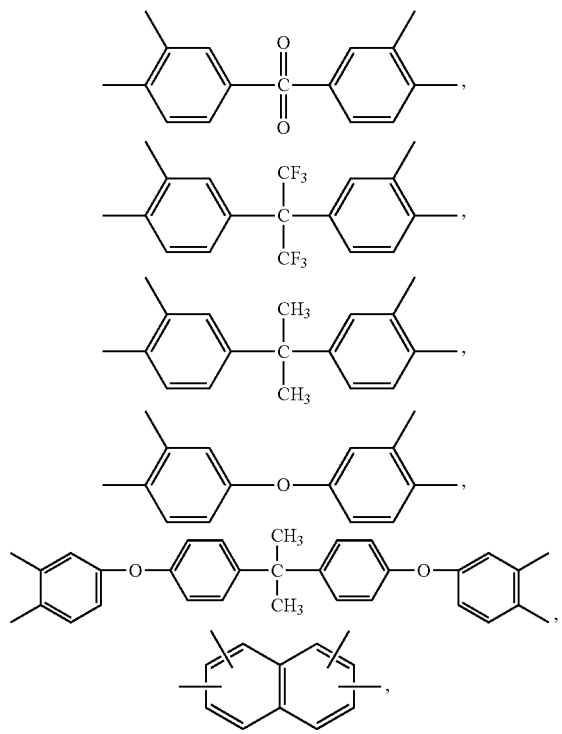

or mixtures thereof. The physical structure of the membranes is asymmetric with a selective dense layer supported on a porous structure. Such membranes can be produced as flat sheets, disks, tubes, hollow fibers or thin films.

U.S. Patent Publication No. 2012/0323059 to UOP LLC relates to gas separation processes using polyimide membranes. A polyimide type is presented with a $CO_2$ permeability of 50 Barrers and a $CO_2/CH_4$ selectivity of 15 at 50° C. Such a membrane features two groups susceptible of intercross-linking by UV radiation.

This polyimde has the following general formula:

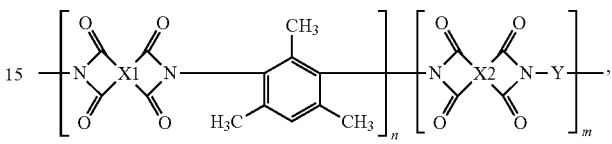

where X1 can be:

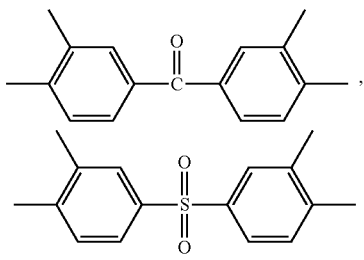

or mixtures; X2 can be:

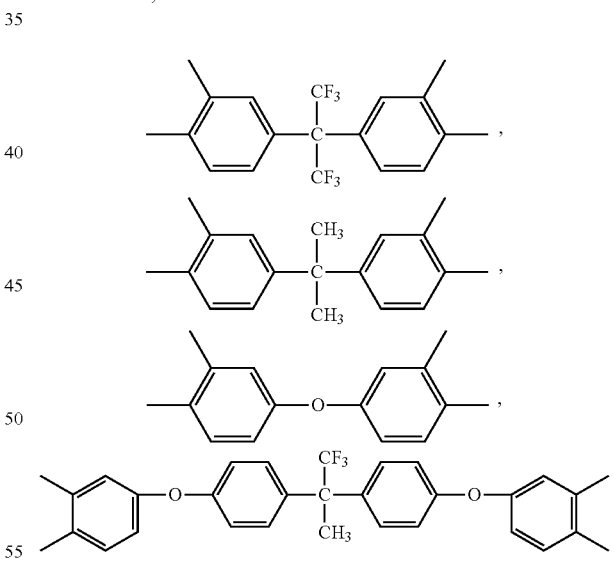

or mixtures; Y can be selected among others:

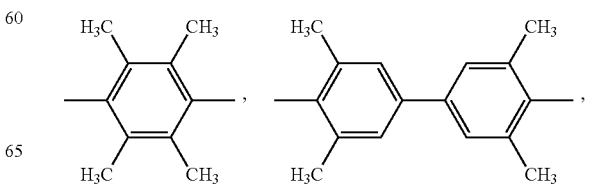

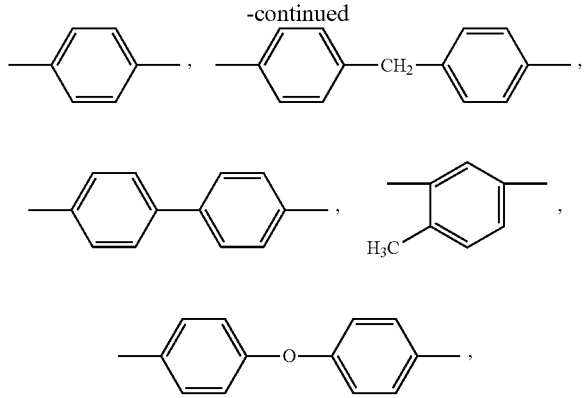

or mixtures.

U.S. Patent Publication No. 2013/0014643 to Membrane Technology and Research, Inc. relates to a conditioning process of fuel gas using vitreous polymer membranes. The process consists of the conditioning of natural gas that contains $C_{3+}$ hydrocarbons and that can be used as feedstock for equipment that use fuel gas such as turbines and compressors. This process uses vitreous polymer membranes that permeate preferably methane above $C_{2+}$ hydrocarbons to produce methane rich current. The membranes that can be used in this process comprise polyamides, polyimides, polysulfones, polyvinyl alcohol, polypropylene oxide, cellulose derivatives, polyvinylidene fluoride and polymers that contain fluorinated dioxole units, fluorinated dioxolones and fluorinated cyclic alkyl ethers. All these polymers permeate methane selectively over higher gaseous hydrocarbons. The selected fluorinated polymer is characterized by having a cyclic structure of at least 5 members, and such fluorinated rings are anchored to the main structure. The polymer should be perfluorinated with a carbon:fluorine ratio of 1:1, amorphous, present a $T_g$ between 100 and 250° C. and not possess ionic groups that could give the membrane hydrophilic characteristics or affinity toward polar materials. That is to say that such a membrane should not feature a considerable swelling in polar solvents such as ethanol, isopropanol, butanol, acetone, acetic acid or water.

The first group of materials that can carry out such separation includes tetrafluoroethylene copolymers with the following structure:

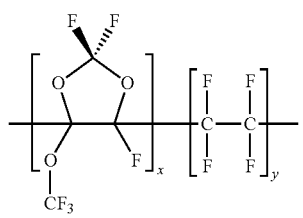

where x and y represent dioxol and tetrafluoroethylene, x+y=1. Such materials are available under the name Hyflon® and are commercialized by Solvay Solexis, Inc.

The second type of polymeric materials for this application feature perfluorinated polymers of vinyl alkenyl ethers with members such as allyl or butenyl with the following structure:

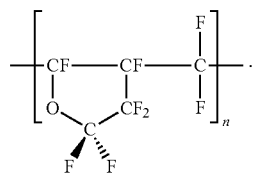

These materials are commercialized under the name Cytop® and are produced by Asahi Glass Company.

The third group of selective materials for the same application is:

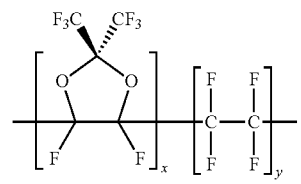

where x and y represent dioxol and tetrafluoroethylene, x+y=1 commercially known as Teflon® produced by Dupont.

Due to the fact that this class of polymers are vitreous and rigid, it is recommended that they be used as part of an asymmetric or composite structure. Preferably, a composite membrane containing a no-selective porous support and a film layer that gives it the required permeation properties should be used.

SUMMARY OF THE INVENTION

The polyimidic membranes of the present invention are novel structures that have not been reported in the state of the art of gas separation membranes. Such compounds are the result of the polycondensation reaction between 4-fluoro-4'4''-diaminotriphenylmethane and different aromatic dianhydrides. In one embodiment, the polyimide has the formula

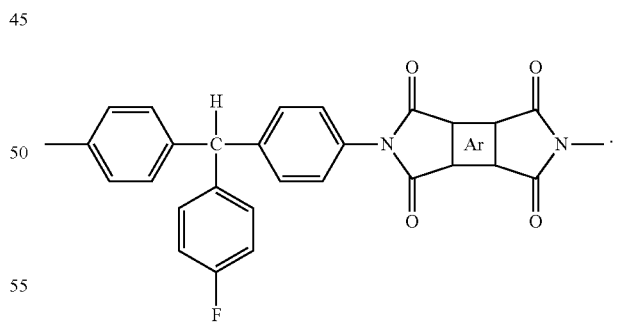

where Ar is selected from the group consisting of

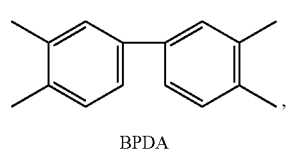

BPDA

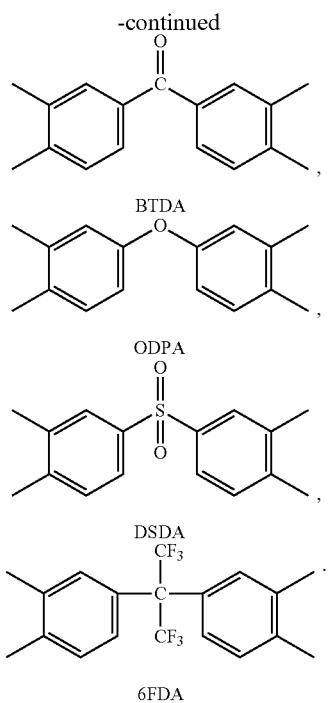

BTDA

ODPA

DSDA

6FDA

The polyimides and the obtained membranes present solubility in aprotic polar solvents, vitreous transition temperatures close to 300° C. and a decomposition temperature above 450° C. The dense membranes obtained by solvent evaporation show excellent permeation and gas separation properties for $H_2/CH_4$, $He/N_2$, $O_2/N_2$ and $CO_2/CH_4$. In one embodiment, the membranes are produced from a polymere consisting essentially of the polyimides of the present invention.

The present invention is directed to a polyimide and to gas separation membranes made from the polyimide. In one embodiment, the polyimide is obtained by the polycondensation reaction of 4-fluoro-4'4"-diaminotriphenylmethane and an aromatic dianhydride. The aromatic dianhydride can be selected from the group consisting of 3,3',4,4'-oxydiphthalic (ODPA), 3,3',4,4'-benzophenontetracarboxylic (BTDA) dianhydrides, 4,4'-(hexafluoroisopropylidene) diphthalic (6FDA) and 3,3',4,4'-biphenyltetracarboxylic (BP DA) anhydrides.

The present invention is also directed to a method of separating a gas from a mixture of gases by passing the gas mixture through a membrane produced from the polyimide. In one embodiment, the membrane is made from a polymer consisting essentially of the polyimide obtained from the polycondensatrion reaction of 4-fluoro-4'4"-diaminotriphenylmethane and an aromatic dianhydride. The membranes according to the invention can have a thickness of about 40-70 microns.

DETAILED DESCRIPTION OF THE INVENTION

The present invention provides a new class of polyimides and polyimide membranes with suitable permeabilities and selectivities for the separation of gases. This invention is also related to the application of these polyimides as membranes for the separation of different gases such as $H_2/CH_4$, $He/N_2$, $O_2/N_2$ and $CO_2/CH_4$. The invention is further directed to a method of separating a gas from a gas mixture by passing the gas mixture through the polyimide membrane and recovering the separated gas.

The synthesis of polyimides that contain in their chemical structure the part coming from the diamine 4-fluoro-4'-4"-diaminotriphenylmethane (FDTM) and an aromatic dianhydride which can be selected from the 3,3',4,4'-oxydiphthalic (ODPA), 3,3',4,4'-benzophenontetracarboxylic (BTDA) dianhydrides, 4,4'-(hexafluoroisopropylidene)diphthalic (6FDA) and 3,3',4,4'-biphenyltetracarboxylic (BPDA) anhydrides, but not limited to them. These compounds are synthesized by the polycondensation method at high temperature using m-cresol as solvent at 13% of solid content in nitrogen presence at 180-200° C., at ambient pressure for 4 h, as it is shown in the reaction scheme below.

Chemical reaction between FDTM and a dihydride.

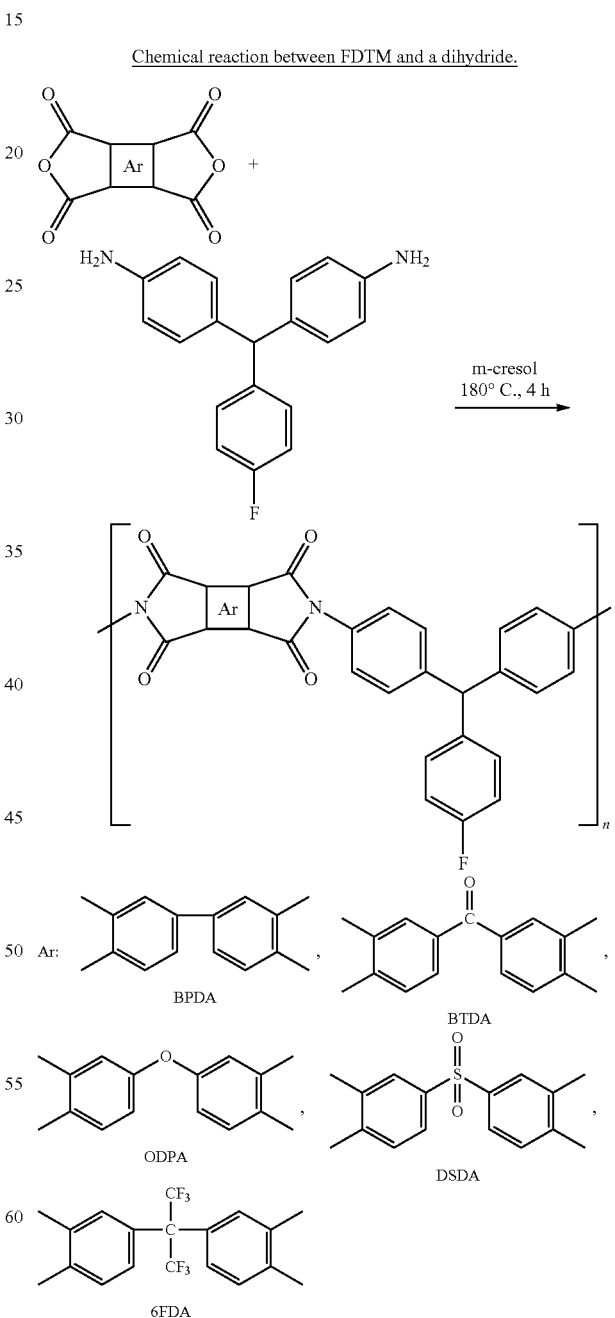

After 4 h of reaction, a highly viscous yellow solution is obtained, which is diluted in N,N'-dimethylformamide in a 1:1 ratio with respect to the m-cresol volume used in the reaction. The resulting polymeric solution is precipitated with ethanol with at least a 10:1 ratio with respect to the total volume to be precipitated. A hair-like precipitate is formed, which has to be left at rest for 2-4 h in order to achieve an exchange of solvents of the matrix of the precipitate. After this time, the precipitate is separated and placed with a new ethanol volume so that the extraction of the highest solvent amount from the polymeric matrix can continue. This process has to be repeated for 3-4 cycles.

Once the precipitate is separated, it is necessary to dry the precipitate in order to eliminate all the solvent from the polymeric matrix. The polymer is dried for 2-4 h at $10^{-2}$ mm Hg and 200-250° C.

The preparation of the dense films for the high performance membranes for gas separation is carried out from a dissolution of the polyimides in N,N'-dimethylformamide at a concentration of 25% p/v. The dissolution was degassed for 20 min under ultrasonic treatment. The degassed solution is poured in glass plates and spread with steel bars with different thickness slots (1, 0.5 and 0.3 mm). Once the solution was spread, the plates and the polymer solution are placed in an oven under vacuum (10-2 mm Hg) in order to proceed to the solvent elimination. The oven temperature was raised to 30° C. for 4 h, afterwards at 100-150° C. for 5 h. Once this time passed, the solution was cooled down and the films were unstuck from the glass plates.

In order to eliminate the solvent completely and preserve the integrity of the membranes, the membranes are attached to metallic frames and dried for 5 h at 250-280° C. and a vacuum of $10^{-2}$ mm Hg, using a heating ramp of 10-15° C./min. In this way, dense membranes with a 40-70 micron thickness were obtained.

The permeation properties of the separation membranes were obtained by the gas A permeability, P(A), and the selectivity, $S_{A/B}$, between the gases A and B. The selectivity was calculated for a pair of pure gases as the permeability relationship of the gases A and B, thus: $S_{A/B}=P(A)/P(B)$.

The permeability of the gas separation membranes was measured according to the method known as variable pressure and constant volume, based on the norm ASTM 1434-82.

EXAMPLES

The examples described in the present invention illustrate the invention, but are not intended to limit the scope of the invention. Different variations can be done in the synthesis of a polyimide containing in its chemical structure the diamine 4-fluoro-4',4",-diaminotriphenylmethane to be applied in the separation of gases, which are found within the scope of this invention.

Example 1

The synthesis of the polyimide poly(4-fluoro-4',4"triphenylmethane-3,3',4,4'-tetracarboxybenzophenone imide), (BTDA-FDTM) was carried out by reacting 8.9 mmol (2.6 g) of FDTM with 8.9 mmol (2.8 g) of BTDA in 30 ml of m-cresol, which correspond to 13% of solids in the solution, in a three-neck flask equipped with a cooling tube with a humidity trap, a thermometer and an inlet for gaseous nitrogen to the reaction solution.

The solution temperature was raised gradually (10° C./min) until reaching 250-280° C. under constant stirring by means of a magnetic bar. At this temperature and with constant nitrogen flow (1 ml/min), the reaction was kept for 4-5 h. After this time, the reaction solution was cooled down to ambient temperature and 30 ml of N,N'-dimethylformamide (DMF) were added to reduce its viscosity. It was stirred with a magnetic bar for 20 min. Afterwards, the reaction solution was poured in 200-300 ml of ethanol to precipitate the polyimide. It was submitted to solvent extraction for 2-3 h. The solution was filtered to separate the polymer from the solvents and again the polymer is submitted to extraction in 200-300 ml of ethanol for 2-3 h. The extraction process of m-cresol and DMF from the polymer matrix is performed 3-4 times in a row. Afterwards, it is dried under vacuum ($10^{-2}$ mm Hg) at 200-250° C. for 2-4 h.

The dried polyimide is dissolved in DMF at a concentration of 25-30% p/v. The solution is degassed under ultrasonic treatment for 20-30 min. The solution is poured over a glass substrate and spread uniformly by means of metallic bars with slots from 0.3 to 1 mm. This liquid film over the glass substrate is placed in a vacuum oven ($10^{-2}$ mm Hg) at 30-40° C. for 3-4 h. After this time, the temperature is raised until 100-150° C. for 4-5 h. The formed film is cooled down and unstuck from the glass substrate. It is attached to metallic frames and dried for 5 h at around 250-280° C. and a vacuum of $10^{-2}$ mm Hg, using a heating ramp of 10-15° C./min.

In order to perform the permeability tests in a system that works at variable pressure (norm ASTM 1434-82), a circle with an area of 4 cm$^2$ is cut from the dense membrane. The pressure and temperature at which the test was carried out were 2 atm and 35° C., respectively.

The permeability results for the BTDA-FDTM polyimide membrane using $H_2$, He, $O_2$, $N_2$, $CH_4$ and $CO_2$ are shown in Table 1.

TABLE 1

Permeability and selectivity of different gases by the BTDA-FDTM polyimide membrane at 35° C. and 2 atm.

| | Permeability, P(A) Barrers | | | | | | Selectivity, P(A)/P(B) | | | |
|---|---|---|---|---|---|---|---|---|---|---|
| Polyimide | $H_2$ | He | $O_2$ | $N_2$ | $CH_4$ | $CO_2$ | $H_2/CH_4$ | $He/N_2$ | $O_2/N_2$ | $CO_2/CH_4$ |
| BTDA-FDTM | 10 | 10 | 0.7 | 0.14 | 0.12 | 3.2 | 78 | 72 | 5.2 | 26 |

Example 2

The synthesis of the polyimide poly(4-fluoro-4',4"triphenylmethane-di(3,4-dicarboxyphenylether imide) (ODPA-FDTM) was carried out by reacting 8.9 mmol (2.6 g) of FDTM with 8.9 mmol (2.7 g) of ODPA in 30 ml of m-cresol. The same procedure described in Example 1 is followed until obtaining the 4-cm$^2$ circle to be submitted to the permeability test.

The permeability results for this ODPA-FDTM polyimide membrane using $H_2$, He, $O_2$, $N_2$, $CH_4$ and $CO_2$ are shown in Table 2.

TABLE 2

Permeability and selectivity of different gases by the ODPA-FDTM polyimide membrane at 35° C. and 2 atm.

| Polyimide | Permeability, P(A), Barrers | | | | | | Selectivity, P(A)/P(B) | | | |
|---|---|---|---|---|---|---|---|---|---|---|
| | $H_2$ | He | $O_2$ | $N_2$ | $CH_4$ | $CO_2$ | $H_2/CH_4$ | $He/N_2$ | $O_2/N_2$ | $CO_2/CH_4$ |
| ODPA-FDTM | 8 | 9 | 0.6 | 0.1 | 0.1 | 2.5 | 85 | 86 | 5.5 | 26 |

Example 3

The synthesis of the polyimide poly(4-fluoro-4',4''triphenylmethane-di(3,4-dicarboxyphenylsulfone imide) (DSPA-FDTM) was carried out by reacting 8.9 mmol (2.6 g) of FDTM with 8.9 mmol (3.1 g) of DSDA in 30 ml of m-cresol. The procedure described in Example 1 was followed until obtaining the 4-cm² circle to be submitted to the permeability test.

The permeability results for this DSDA-FDTM polyimide membrane using $H_2$, He, $O_2$, $N_2$, $CH_4$ and $CO_2$ are shown in Table 3.

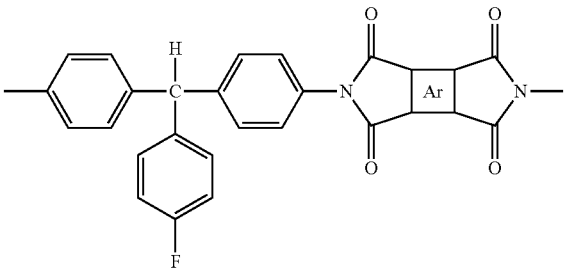

TABLE 3

Permeability and selectivity of different gases by the DSDA-FDTM polyimide membrane at 35° C. and 2 atm.

| Polyimide | Permeability, P(A) Barrers | | | | | | Selectivity, P(A)/P(B) | | | |
|---|---|---|---|---|---|---|---|---|---|---|
| | $H_2$ | He | $O_2$ | $N_2$ | $CH_4$ | $CO_2$ | $H_2/CH_4$ | $He/N_2$ | $O_2/N_2$ | $CO_2/CH_4$ |
| DSDA-FDTM | 9 | 10 | 0.7 | 0.12 | 0.11 | 3.4 | 86 | 82 | 5.6 | 31 |

Example 4

The synthesis of the polyimide poly(4-fluoro-4',4''triphenylmethane-2,2'bis-(3,4-dicarboxyphenyl)-hexafluoropropane imide) (FDTM-6FDA) was carried out by reacting 8.9 mmol (2.6 g) of FDTM with 8.9 mmol (3.9 g) of 6FDA in 30 ml of m-cresol. The procedure described in Example 1 was followed until obtaining the 4-cm² circle to be submitted to the permeability test.

The permeability results for this 6FDA-FDTM polyimide membrane using $H_2$, He, $O_2$, $N_2$, $CH_4$ and $CO_2$ are shown in Table 4.

TABLE 4

Permeability and selectivity of different gases by the 6FDA-FDTM polyimide membrane at 35° C. and 2 atm.

| Polyimide | Permeability, P(A) Barrers | | | | | | Selectivity, P(A)/P(B) | | | |
|---|---|---|---|---|---|---|---|---|---|---|
| | $H_2$ | He | $O_2$ | $N_2$ | $CH_4$ | $CO_2$ | $H_2/CH_4$ | $He/N_2$ | $O_2/N_2$ | $CO_2/CH_4$ |
| 6FDA-FDTM | 60 | 58 | 6.8 | 1.3 | 0.9 | 35 | 70 | 45 | 5.3 | 41 |

What is claimed is:

1. A separation membrane for gas separation comprising high molecular weight polyimides obtained from 4-fluoro-4',4''-diaminotriphenylmethane, and having as a repeating unit the following molecular structure:

where Ar is an aromatic organic group derived from tetracarboxylic acids.

2. The separation membrane of claim 1, wherein the tetracarboxylic acid is selected from the group consisting of 3,3',4,4'-oxydiphthalic (ODPA), 3,3',4,4'-benzophenontetracarboxylic (BTDA) dianhydrides, 4,4'-(hexafluoroisopropylidene)diphthalic (6FDA), and 3,3',4,4'-biphertyltetracarboxylie (BPDA) anhydrides, a mixture of two or more of these compounds.

3. The separation membrane of claim 1, wherein a mixture of two gases can be separated, where a component of the gaseous mixture passes through the separation membrane at a faster velocity and is separated selectively.

4. The separation membrane of claim 3, wherein said separation membrane is adapted for separation of a gaseous mixture comprising $H_2/CH_4$.

5. The separation membrane of claim 3, wherein said separation membrane is adapted for separation of a gaseous mixture comprising $He/N_2$.

6. The separation membrane of claim 3, wherein said separation membrane is adapted for separation of a gaseous mixture comprising $H_2/CO_2$.

7. The separation membrane of claim 3, wherein said separation membrane is adapted for separation of a gaseous mixture comprising $O_2/N_2$.

8. The separation membrane of claim 3, wherein said separation membrane is adapted for separation of a gaseous mixture comprising $CO_2/CH_4$.

9. The separation membrane of claim 3, wherein said separation membrane is adapted for separation of a gaseous mixture comprising $CO_2/N_2$.

10. The separation membrane of claim 1, wherein Ar is selected from the group consisting of

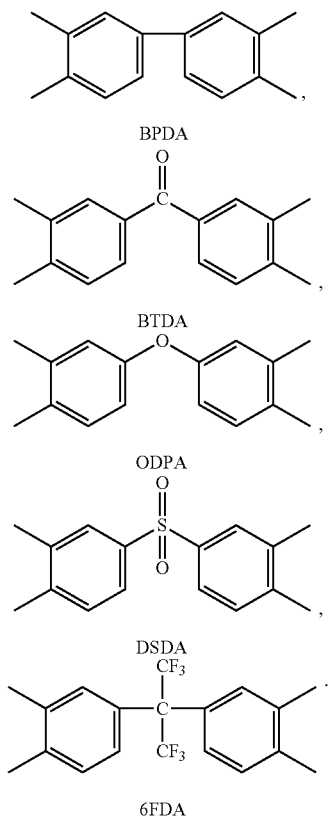

11. A gas separation membrane adapted for separation of gases in a gas mixture, said membrane comprising a polyimide obtained from the reaction of 4-fluoro-4',4''-diaminotriphenylmethane and an aromatic dianhydride.

12. The separation membrane of claim 11, wherein said polyimide is obtained from the reaction of said 4-fluoro-4',4''-diaminotriphenylmethane and where said aromatic dianhydride is selected from the group consisting of 3,3',4,4'-oxydiphthalic (ODPA), 3,3'4,4'-benzophenontetracarboxylic (BTDA) dianhydrides, 4,4'-(hexafluoroisopropylidene) diphthalic (6FDA), and 3,3',4,4-biphenyltetracarboxylic (BPDA) anhydrides.

13. A method of separating a gas from a gas mixture comprising the step of
    passing the gas mixture through a polyimide membrane, wherein said polyimide membrane is obtained by the reaction of 4-fluoro-4',4''-diaminotriphenylmethane and an aromatic dianhydride.

14. The method of claim 13, wherein said polyimide has the molecular formula

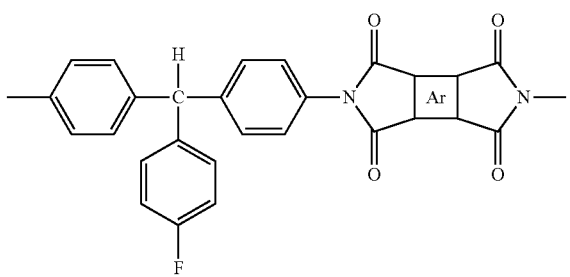

where Ar is an aromatic group derived from a tetracarboxylic acid.

15. The method of claim 13, wherein said polyimide is obtained from the reaction of said 4-fluoro-4',4''-diarnino-triphenylmethane and where said aromatic dianhydride is selected from the group consisting of 3,3',4,4'-oxydiphthalic (ODPA), 3,3',4,4'-benzophenontetracarboxylic (BTDA) dianhydrides, 4,4'-(hexafluoroisopropylidene)diphthalic (6FDA), and 3,3',4,4'-biphenyltetracarboxylic (BPDA) anhydrides.

16. The method of claim 13, wherein said gas mixture is selected from the group consisting of $H_2/CH_4$, $He/N_2$, $H_2/CO_2$, $O_2/N_2$, $CO_2/CH_4$ and $CO_2/N_2$.

17. The method of claim 14, wherein Ar is selected from the group consisting of

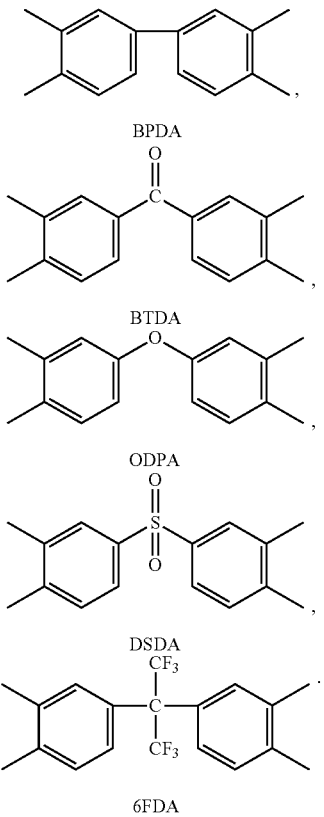

18. A gas separation membrane comprising a polyimide obtained from 4-fluoro-4',4''-diarninotriphenylmethane having the following structure

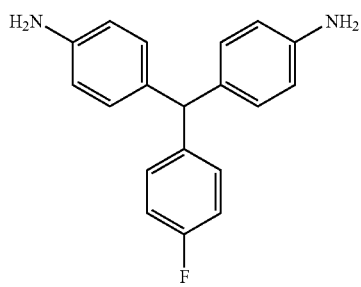 [SMILES: Nc1ccc(C(c2ccc(N)cc2)c2ccc(F)cc2)cc1]
where said polyimide has a repeating unit with the structure
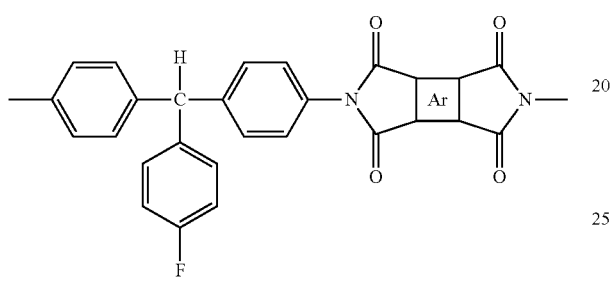
where Ar is an aromatic organic group derived from tertacarboxylic acids.
* * * * *